US 8,689,326 B2

(12) United States Patent
Keeni (10) Patent No.: US 8,689,326 B2
(45) Date of Patent: Apr. 1, 2014

(54) DEVICE FOR ANALYZING AND DIAGNOSING NETWORK TRAFFIC, A SYSTEM FOR ANALYZING AND DIAGNOSING NETWORK TRAFFIC, AND A SYSTEM FOR TRACING NETWORK TRAFFIC (75) Inventor: Glenn Mansfield Keeni, Sendai (JP)

(73) Assignee: Cyber Solutions Inc., Miyagi (JP)

( * ) Notice: Subject to any disclaimer, the term of this patent is extended or adjusted under 35 U.S.C. 154(b) by 1023 days.

(21) Appl. No.: 12/161,139

(22) PCT Filed: Jan. 16, 2007

(86) PCT No.: PCT/JP2007/050512
§ 371 (c)(1),
(2), (4) Date: Apr. 1, 2010

(87) PCT Pub. No.: WO2007/081023
PCT Pub. Date: Jul. 19, 2007

(65) Prior Publication Data
US 2011/0317566 A1    Dec. 29, 2011

(30) Foreign Application Priority Data

Jan. 16, 2006    (JP) .................................. 2006-007349

(51) Int. Cl.
*H04L 29/06*    (2006.01)
(52) U.S. Cl.
USPC ................................ 726/22; 726/13; 709/224
(58) Field of Classification Search
None
See application file for complete search history.

(56) References Cited

U.S. PATENT DOCUMENTS

| 5,459,777 | A | 10/1995 | Bassa et al. | |
|---|---|---|---|---|
| 7,478,429 | B2 * | 1/2009 | Lyon | 726/23 |
| 7,526,807 | B2 * | 4/2009 | Chao et al. | 726/23 |
| 7,584,507 | B1 * | 9/2009 | Nucci | 726/23 |
| 7,609,629 | B2 * | 10/2009 | Watanabe et al. | 370/230 |
| 7,992,208 | B2 * | 8/2011 | Khandani et al. | 726/25 |
| 2004/0062199 | A1 * | 4/2004 | Lau et al. | 370/230 |

(Continued)

FOREIGN PATENT DOCUMENTS

| JP | 2004-312064 | 11/2004 |
|---|---|---|
| JP | 2005-159551 | 6/2005 |

(Continued)

OTHER PUBLICATIONS

Kunio Goto and Koji Kojima "Design and Implementation of Anomaly Detection System with Classified Packet Counting" IEICE Technical Reporto NS2005-4.

*Primary Examiner* — Michael R Vaughan
(74) *Attorney, Agent, or Firm* — Young & Thompson (57) ABSTRACT

A system detects the presence of illegal access attacks. The device for analyzing and diagnosing network traffic divides packets into k (k>0) types based on protocol type and port number, etc., a component observing the number of distinct values of one or more pre-specified fields in packet header for each packet type, for all packets that have transited the observation points in a network, an element observing the number of distinct values of one or more pre-specified fields in the packet payload for each packet type, for all packets that have transited the observation points in a network, and a diagnosis element determining whether the network is abnormal when the number of distinct values observed in fields of each packet type crosses a specified ratio-threshold within a predetermined interval. This enables detection of small-scale DoS attacks with little change in addresses number, improving illegal access detection accuracy.

13 Claims, 3 Drawing Sheets

(56) References Cited

U.S. PATENT DOCUMENTS

| | | |
|---|---|---|
| 2004/0148138 A1 | 7/2004 | Garnett et al. |
| 2004/0250124 A1* | 12/2004 | Chesla et al. ............... 713/201 |
| 2005/0111367 A1* | 5/2005 | Jonathan Chao et al. ..... 370/235 |
| 2005/0198519 A1 | 9/2005 | Tamura et al. |
| 2006/0010389 A1* | 1/2006 | Rooney et al. ............... 715/736 |
| 2006/0107318 A1* | 5/2006 | Jeffries et al. ................. 726/22 |
| 2008/0016562 A1* | 1/2008 | Keeni ............................. 726/22 |
| 2008/0028467 A1* | 1/2008 | Kommareddy et al. ........ 726/23 |
| 2008/0052774 A1* | 2/2008 | Chesla et al. .................. 726/13 |
| 2009/0240804 A1* | 9/2009 | Zhao et al. .................... 709/224 |
| 2009/0265784 A1* | 10/2009 | Waizumi et al. ................ 726/23 |
| 2009/0271865 A1* | 10/2009 | Jiang .............................. 726/23 |
| 2013/0081136 A1* | 3/2013 | Jiang .............................. 726/22 |

FOREIGN PATENT DOCUMENTS

| | | |
|---|---|---|
| JP | 2005-210292 | 8/2005 |
| JP | 2005-252808 | 9/2005 |
| WO | WO 2005/074215 | 8/2005 |

* cited by examiner

FIG. 1

■ Packet data format (Protocol type: TCP)

| IP header | TCP header | DATA |
|---|---|---|

■ IP header field (IPv4)

| Field | Size (bit) |
|---|---|
| Version | 4 |
| Header length | 4 |
| Type of Service | 8 |
| Total length | 16 |
| Identification | 16 |
| Flag | 3 |
| Fragment offset | 13 |
| Time to Live | 8 |
| Protocol | 8 |
| Header checksum | 16 |
| Source address | 32 |
| Destination address | 32 |
| Option | -- |

■ TCP header field

| Field | Size (bit) |
|---|---|
| Source port number | 16 |
| Destination port number | 16 |
| Sequence number | 32 |
| Acknowledgement number | 32 |
| TCP header length | 4 |
| Reserved | 6 |
| Flag | 6 |
| Window size | 16 |
| Checksum | 16 |
| Urgent Pointer | 16 |
| Option | -- |

DEVICE FOR ANALYZING AND DIAGNOSING NETWORK TRAFFIC, A SYSTEM FOR ANALYZING AND DIAGNOSING NETWORK TRAFFIC, AND A SYSTEM FOR TRACING NETWORK TRAFFIC

TECHNICAL FIELD

This invention gives details of analysis and diagnosis of network traffic based on packet information.

BACKGROUND TECHNOLOGY

Patent document 1 has introduced the concept that Category Transform is effective in statistically analyzing network traffic by observing the volume of traffic, or the amount of information on a communication line. This technique is useful to detect the presence of illegal accesses such as DoS (Denial of Services) attacks and DDoS (Distributed Denial of Services) attacks.

A effective (D)DoS attack is achieved by sending a large number of packets with spoofed source address in the packet header. When the volume of incoming packets is more than the processing capacity of the target equipment, the equipment will not be able handle the regular communication packets from regular users. It is difficult to distinguish between (D)DoS attack packets and regular communication packets. Hence, high detection accuracy cannot be expected when traditional methods are employed.

In Category Transform, "category" of a field (or a combination of fields) is a property that characterizes a packet with a distinct value in the field (s). For example, "All packets whose protocol field has value TCP" is a category. Category Transform is the method for computing the distribution of the number of categories, from the distribution of the number of packets, based on the category that the detected packet belongs to.

Using Category Transform, the system will judge that a network attack is in progress if the number of distinct values observed in the pre-specified category crosses a pre-specified number-threshold within a pre specified time interval. The accuracy of detection of illegal access is improved by this way.

It is Patent Laid-Open No. WO 2005/074215 bulletin [patent document 1].

DISCLOSURE OF THE INVENTION

Problem to be Solved by the Invention

However in Patent Document 1, since the system detects (D)DoS attacks by observing all packets comprehensively without any classification, it is difficult to detect small-scale (D)DoS attacks where few addresses change and communication applications which use a few addresses such as WINNY. Therefore, when the network is highly loaded, the system may not be able to detect the change of the number of packets involved in a particular application since overall traffic volume is also large. Thus illegal attacks may go undetected.

To solve the above-mentioned problems, this invention presents a device for analyzing and diagnosing network traffic, a system for analyzing and diagnosing network traffic, and a system for tracing network traffic, which can easily detect an illegal access such as (D)DoS attacks with high accuracy. These devices and systems examine the header of the packets which pass the observation point, and observe the values of one or more pre-specified fields in the header of packets with respect to each packet type. If the number of distinct values observed in the pre-specified fields or their ratio crosses a pre-specified ratio-threshold within a pre-specified fixed time interval, these systems will judge that the network condition is abnormal. That is, they classify the packets into some groups (e.g. application type), and apply Category Transform to each group to achieve this result.

Means to Solve the Problem

To achieve the above-mentioned purpose, the invention is a device for analyzing and diagnosing network traffic, for analyzing and diagnosing the network traffic based on the header information of the packets in transmission, wherein the device comprises a means of dividing the packets into k types based on protocol type and port number, etc, where k is a natural number greater than zero, a means of observing the number of distinct values of one or more pre-specified fields in packet header with respect to each packet type, for all packets that have transited the observation points in a network, a means of observing the number of distinct values of one or more pre-specified fields in the payload of packet with respect to each packet type, for all packets that have transited the observation points in a network, and a diagnosis means of judging that the network is abnormal when the number of distinct values observed in the above-mentioned fields of each packet type crosses a pre-specified ratio-threshold within a pre-specified fixed time interval.

The following are the header fields, using the IPv4 protocol packet as an example.
Version
Header length
Type of Service
Total length
Identification
Flag
Fragment offset
Time to Live
Protocol
Header checksum
Source address
Destination address
Option
Source port address
Destination port address The field value of packet payload is determined by protocol type or other values.

The invention is also the device for analyzing and diagnosing network traffic, wherein the above-mentioned pre-specified ratio is calculated based on either of the following conditions:

(a) $N(t)$ is the number of distinct values observed in the above-mentioned fields within a pre-specified fixed time interval from some time t, $N(t1)$ is the number of distinct values observed in the above-mentioned fields within the pre-specified time fixed interval from some time t1, and if the ratio of $N(t)$ to $N(t1)$ is greater than, or equal to, some pre-specified ratio-threshold k1, that is, if $N(t)/N(t1) \geq k1$, it is judged that the network is abnormal.

(b) $P(t)$ is the number of packets in transmission within the above-mentioned fixed time interval from some time t, and if the ratio of $N(t)$ to $P(t)$ is greater than, or equal to, some pre-specified ratio-threshold k2, that is, if N(t)/P(t)≥k2, it is judged that the network is abnormal.

(c) P(t1) is the number of packets in transmission within the above-mentioned fixed time interval from some time t1, and if the ratio of the coefficient computed in above-mentioned (b) for the time t to that computed for the time t1, {N(t)/P(t)}/{N(t1)/P(t1)}, is greater than, or equal to, some pre-specified ratio-threshold k3, that is, if {N(t)/P(t)}/{N(t1)/P(t1)}≥k3, it is judged that the network is abnormal.

(d) T(t) is the number of octets (or bits) in the packets in transmission within the above-mentioned fixed time interval from some time t, and if the ratio of N(t) to T(t) is greater than, or equal to, some pre-specified ratio-threshold k4, that is, if N(t)/T(t)≥k4, it is judged that the network is abnormal.

(e) IF the ratio of the coefficient computed in above-mentioned (a)~(d) is lower than, or equal to, some pre-specified ratio-threshold k5, it is judged that the network is abnormal.

The invention is also the device for analyzing and diagnosing network traffic, wherein the above-mentioned field is composed of an arbitrary combination of fields in the header or the payload of the packet with respect to each packet type, and the above-mentioned diagnosis means judges that the network is abnormal when the number of distinct values observed in the above-mentioned fields reaches a pre-specified ratio-threshold within a pre-specified fixed time interval.

The invention is also the device for analyzing and diagnosing network traffic, wherein the above-mentioned diagnosis means judges that a network attack is in progress when the TTL (Time To Live) value in the header field of the packet does not lie in the range of the pre-specified values because the number of hops based on TTL value in the packet header is almost fixed.

The invention is also the device for analyzing and diagnosing network traffic, wherein the above-mentioned field is composed of an arbitrary combination of fields in the header or the payload of the packet with respect to each packet type, and the above-mentioned diagnosis means judges that the network is abnormal when the number of distinct values observed in the above-mentioned fields reaches a pre-specified number-threshold within a pre-specified fixed time interval.

The invention described is also a system for analyzing and diagnosing network traffic, for analyzing and diagnosing the network traffic based on the header information of the packets in transmission, wherein the system makes use of the devices described in Claim-1 to Claim-5 by setting these systems up on the route along which the packets pass.

The invention is also a traffic-tracing system, for tracing the source of illegal access in the network, wherein the system makes use of the devices described in Claim-1 to Claim-5 by setting these systems up at various places in the network and detecting the directional characteristics of an illegal access by comparing the similarity of data detected in the systems where an illegal access has been detected.

Effect of the Invention

In an embodiment of the invention, the values of one or more pre-specified fields in the header and/or the payload of packets which is transmitted from external networks are observed, i.e., packets are observed by classifying the packets into some groups (e.g. application type). This technique enables us to detect small-scale DoS attacks where there is little change in the number of addresses, or to detect specific applications which use few addresses such as WINNY. As a result, the probability of missing illegal accesses has decreased and detection accuracy has improved. When an illegal access is detected, since the type of application is specified, it is possible to deal with it more quickly than ever before. Moreover, communication failures such as link failures and out-of-service state caused by application error are easily detected. Therefore, when a problem arises, it can be handled quickly.

In a further embodiment, since an illegal access is detected based on the criteria shown in (a)~(e), it is easy to set the threshold. Therefore an improvement in the detection accuracy of illegal access can be expected.

In a further embodiment, the detection accuracy of illegal access has been improved by using an arbitrary combination of two or more headers as a field value.

In a further embodiment, because the number of hops based on TTL value in the packet header is almost fixed, it is possible to judge that a network attack is in progress if it does not lie in the range of the pre-specified values.

In a further embodiment, by using the pre-specified number in place of the pre-specified ratio as the criterion of judgment, the overhead for calculation process can be reduced. And the detection accuracy of illegal accesses can be increased by using not only a field but an arbitrary combination of two or more fields as a field value.

A further embodiment allows automatic detection of illegal accesses with high accuracy by setting up devices for detecting and diagnosing network traffic on the route where the network packets pass. And when an illegal access is detected, since the application is identified, the handling of the problem is quicker than before.

A further embodiment allows comparing the data for similarity and detecting the directional characteristics of network traffic by setting up devices for detecting and diagnosing network traffic in various places on the network. Thereby the source of illegal access can be traced.

EXPLANATION OF CODES USED IN THE DIAGRAMS

101 A personal computer (IP Address: 100.100.100.1)
102 A personal computer (IP Address: 100.100.100.2)
103 A personal computer (IP Address: 100.100.100.3)
104 A Router
105 A device for detecting and diagnosing network traffic

BEST MODE FOR CARRYING OUT THE INVENTION

Next, based on the diagrams, a prototype of the system for detecting and diagnosing network traffic of this invention is described. However, the invention is not limited to this prototype.

Figure 1:
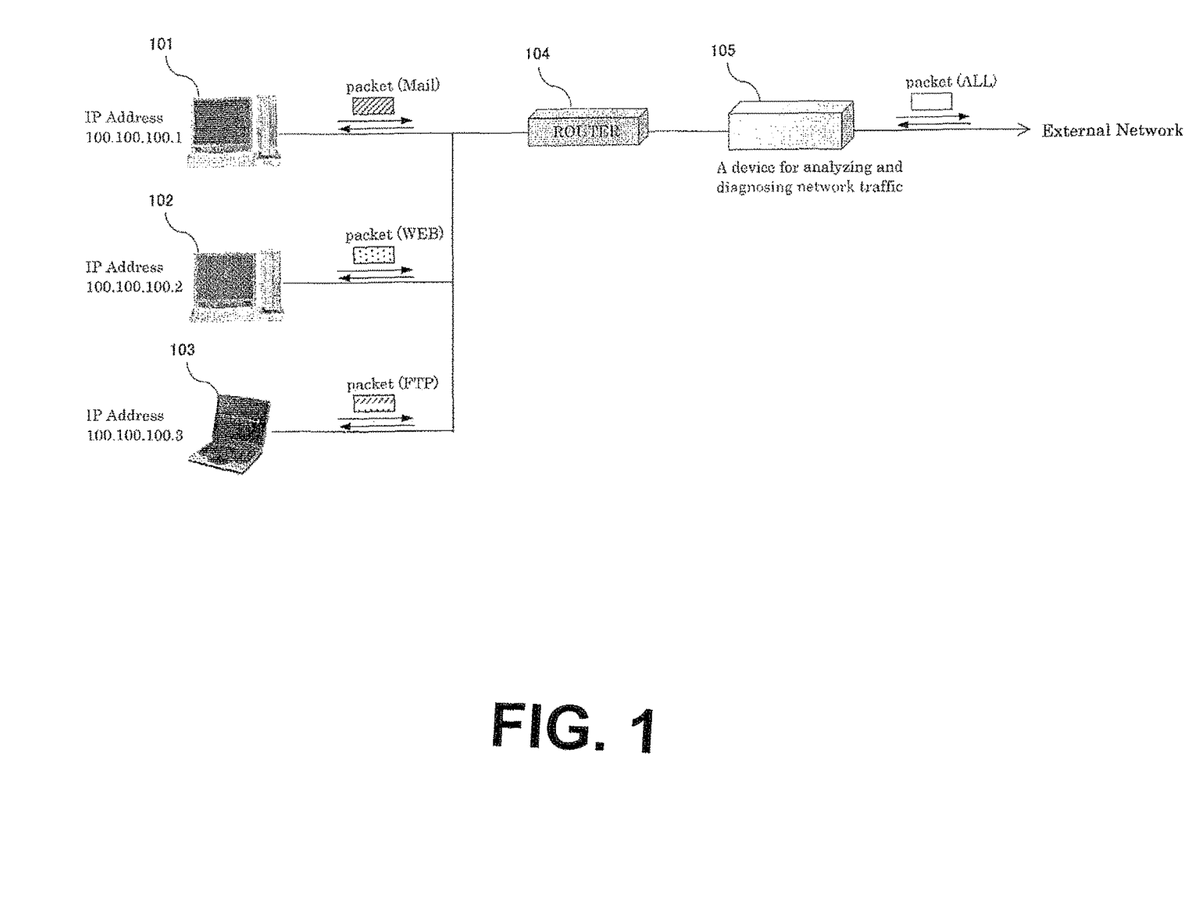
FIG. 1 is a schematic diagram illustrating the construction of the prototype of a system for detecting and diagnosing network traffic using this invention.

FIG. 1 is a schematic diagram illustrating the construction of the prototype of a system for detecting and diagnosing network traffic according to this invention. Shown in FIG. 1, the system has device 105 set up on the route where packets from external networks pass. A router 104 sorts packets from external networks into each device by destination IP address. In the example of FIG. 1, the packets whose destination IP addresses is (100.100.100.1) are sorted into PC 101, the packets whose destination IP addresses is (100.100.100.2) are sorted into PC 102, and the packets whose destination IP addresses is (100.100.100.3) are sorted into PC 103.

Device 105 has the means to divide packets into k types based on protocol type such as port number, and observe the number of distinct values of specific fields in packet header with respect to each packet type. And it also has the means to observe the number of distinct values of specific field in the header or payload of packets with respect to each packet type. It diagnoses network traffic by analyzing the change of the number of above-mentioned field values with respect to each packet type. Since k is the natural number whose value is one or more, it is right to think that k is an application type. In the case of FIG. 1, packets are classified as those for Mail, Web, and FTP. And the number of distinct values in the pre-specified field is observed.

Since the values in a field are in a certain range, if a big change is observed, the system can judge that the network is abnormal. Therefore device 105 judges that the network is abnormal when the number of distinct values seen in a combination of two or more fields in a header and/or a payload exceeds a pre-specified ratio-threshold within a pre-specified time with respect to k packet types.

Figure 2:
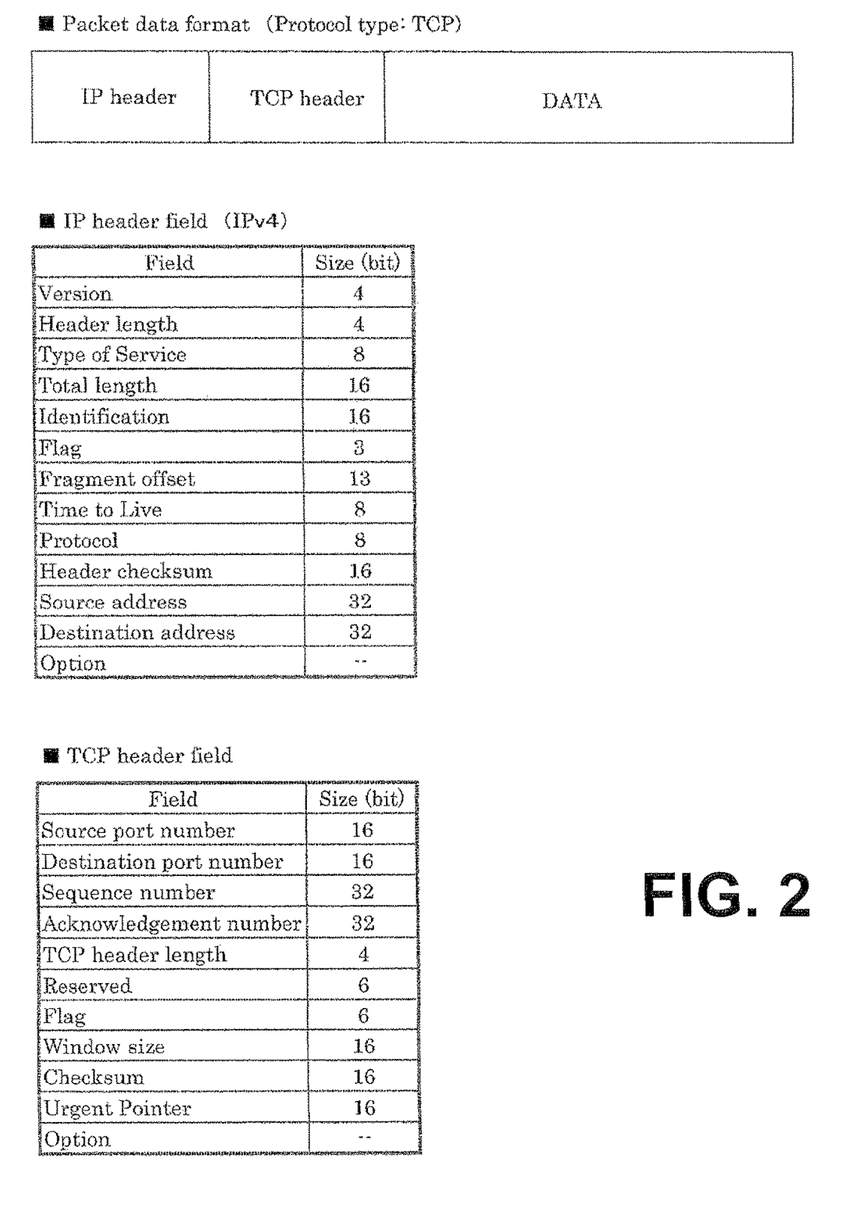
FIG. 2 is a diagram illustrating the explanation of the prototype of the data type of packets which is observed by a system for detecting and diagnosing network traffic using this invention.

Data format of a packet is shown in FIG. 2 (in case the protocol type is TCP), and field items which constitute IP header and TCP header is also shown in FIG. 2. Among these items, using the IPv4 protocol packet as an example, the following are the header field in this invention.

Version
Header length
Type of Service
Total length
Identification
Flag
Fragment offset
Time to Live
Protocol
Header checksum
Source address
Destination address
Option
Source port address
Destination port address E.g. say the pre-specified header field is the Source address field, and the distinct addresses observed are (100.100.100.1), (100.100.100.2), and (100.100.100.3). The number of distinct values for the field is 3. The value of field in payload is determined from the protocol type, and so on.

A DoS attack is an example of an illegal attack. In a DoS attack a target is flooded with a large volume of unwanted and useless communication packets, which is more than the processing capacity of the target and thus rendering the target unable to process regular packets. This DoS attack has the following features. In most cases, to prevent the target from identifying the origin, the Source address in the DoS packet header field is spoofed. To prevent the filtering of DoS packets by relating them to one or more Source addresses, the Source address field is randomly generated.

Device 105 observes, for example, the number of distinct values in the Source address in the header field of packets sent from external networks with respect to packet type. If an attacker randomly selects the Source address, the number of observed Source addresses will increase. Within a pre-specified time interval, a number of packets which have the same Source address are generally observed. But when an attack is in progress, typically only one attack packet for a Source address is observed. Therefore, when the number of distinct value of Source address crosses a pre-specified ratio-threshold within a pre specified fixed time interval, the device can judge that an attack is in progress.

Device 105 divides the packet into k types based on protocol type such as protocol type or port number, and observes the number of distinct value of a pre-specific field in a header and/or a payload of packet with respect to packet type. In this manner, the device can observe packets at the application level, i.e., when the network is highly loaded, the total packets from external networks will increase and the variation in the amount of packets of each application will also increase. However, because the packets are observed at application level, even if an illegal access, such as (D)DoS attack, occurs in a low traffic application, the detection of illegal access will succeed.

For example, the number of distinct values of Source address is classified by packets for mail (SMTP), packets for Web (HTTP), and other packets (OTHER). The following is an example of such a case.

TABLE 1

| | The number of distinct values of Source address | | | |
|---|---|---|---|---|
| Time | SMTP | HTTP | OTHER | TOTAL |
| 10:01 | 455 | 290 | 7 | 752 |
| 10:02 | 445 | 285 | 8 | 738 |
| 10:03 | 395 | 270 | 110 | 775 |
| 10:04 | 410 | 265 | 105 | 780 |
| 10:05 | 440 | 295 | 9 | 744 |
| . | . | . | . | . |
| . | . | . | . | . |
| . | . | . | . | . |

In the example of table 1, the number of distinct values of Source address of "OTHER" packets increases more than 10 times from 10:02 to 10:03/10:04. It can be judged that an illegal access is in progress. But the increase of total packets is only a small percentage of the total. Therefore, the illegal access may not be detected if the system detects illegal accesses observing the count of all packets.

As above, the observation by application level is facilitated by observing the values of one or more pre-specified fields in the header and/or the payload of packets which is sent from external networks. Consequently, even if an illegal access, such as (D)DoS attack, occurs in a low traffic application, the detection of illegal access will succeed in most cases. Moreover, when an illegal access is detected, the problem can be handled faster than before as the problem area is identified.

Device 105 carries out judgment based on the above-mentioned pre-specified ratio which is calculated based on either of the following conditions:

(a) N(t) is the number of distinct values observed in the above-mentioned fields within a pre-specified fixed time interval from some time t, N(t1) is the number of distinct values observed in the above-mentioned fields within the pre-specified time fixed interval from some time t1, and if the ratio of N(t) to N(t1) is greater than, or equal to, some pre-specified ratio-threshold k1, that is, if N(t)/N(t1)≥k1, it is judged that the network is abnormal.

(b) P(t) is the number of packets in transmission within the above-mentioned fixed time interval from some time t, and if the ratio of N(t) to P(t) is greater than, or equal to, some pre-specified ratio-threshold k2, that is, if N(t)/P(t)≥k2, it is judged that the network is abnormal.

(c) P(t1) is the number of packets in transmission within the above-mentioned fixed time interval from some time t1, and if the ratio of the coefficient computed in above-mentioned (b) for the time t to that computed for the time t1, {N(t)/P(t)}/{N(t1)/P(t1)}, is greater than, or equal to, some pre-specified ratio-threshold k3, that is, if {N(t)/P(t)}/{N(t1)/P(t1)}≥k3, it is judged that the network is abnormal.

(d) T(t) is the number of octets (or bits) in the packets in transmission within the above-mentioned fixed time interval from some time t, and if the ratio of N(t) to T(t) is greater than, or equal to, some pre-specified ratio-threshold k4, that is, if N(t)/T(t)≥k4, it is judged that the network is abnormal.

(e) IF the ratio of the coefficient computed in above-mentioned (a)~(d) is lower than, or equal to, some pre-specified ratio-threshold k5, it is judged that the network is abnormal.

It is necessary to select an appropriate criterion (a)~(e), depending on the network environment where device 105 is setup. High detection accuracy can be achieved by selecting an appropriate criterion depending on the network environment such as scale and objective.

Next, device 105 observes the number of distinct values of a pre-specific field in a header and/or a payload of packet with respect to packet type, and when the number of distinct values seen in a combination of two or more header fields exceeds a pre-specified ratio-threshold within a pre-specified time, it is inferred that an illegal access is in progress. In these operations, not only one field but a combination of two or more fields is used.

In the explanation above, Source address has been used. For example, the system employs a combination of Source address and Source port number as a field value instead, and carries out judgment based on one of the criterion (a)~(e). The accuracy of illegal access detection can be improved by using a combination of two or more values as a field value.

In addition to the above-mentioned criteria (a)~(e), when the number of hops based on the TTL (Time to Live) value in the header field of a packet does not lie in the pre-specified range, the system will judge that the network is abnormal. The accuracy of illegal access detection can be additionally improved by this way.

A packet is dropped from the Internet when the value of the TTL (Time to Live) field in the packet header becomes 0, to prevent packets from looping infinitely. For a given value of the Source address field, the value of the TTL field seen at a fixed point in the network is almost fixed, if the Source address is not faked. Therefore, by comparing the actual value of the TTL field for the given value of the Source address field, with the expected value of the TTL for that source, if there is a significant difference in the TTL value, it can be inferred that the packet is a spoofed packet.

As mentioned above, device 105 infers that the network is abnormal when the number of distinct values seen in a combination of two or more header fields exceeds a pre-specified number-threshold value within a pre-specified time. Also, device 105 examines the header of packets in transmission, and observes the values of arbitrary combinations of two or more fields in packet header and/or packet payload. If the number of distinct values observed in the pre-specified fields crosses a pre-specified number-threshold within a pre-specified fixed time interval the system will judge that the network is abnormal. That is, the system divides the packet into k types based on protocol type, and if the number of distinct values observed in the pre-specified fields for each packet type crosses a pre-specified number-threshold within a pre-specified fixed time interval the system will judge that the network is abnormal. In this case, not one field but an arbitrary combination of two or more fields is used and if the number of distinct values observed in the pre-specified fields crosses a pre-specified number-threshold within a pre-specified time interval the system will judge that the network is abnormal.

The overhead of calculation process can be reduced by using the pre-specified number in place of the pre-specified ratio as the criteria for detecting illegal access. And the detection accuracy of illegal access can be enhanced by employing an arbitrary combination of two or more fields as a field value.

In addition to the above-mentioned criteria, when the number of hops calculated from the TTL (Time to Live) value in the header field of a packet does not lie in the pre-specified range, the system will judge that the network is abnormal. The accuracy of illegal access detection can be further improved by this way.

Figure 3:
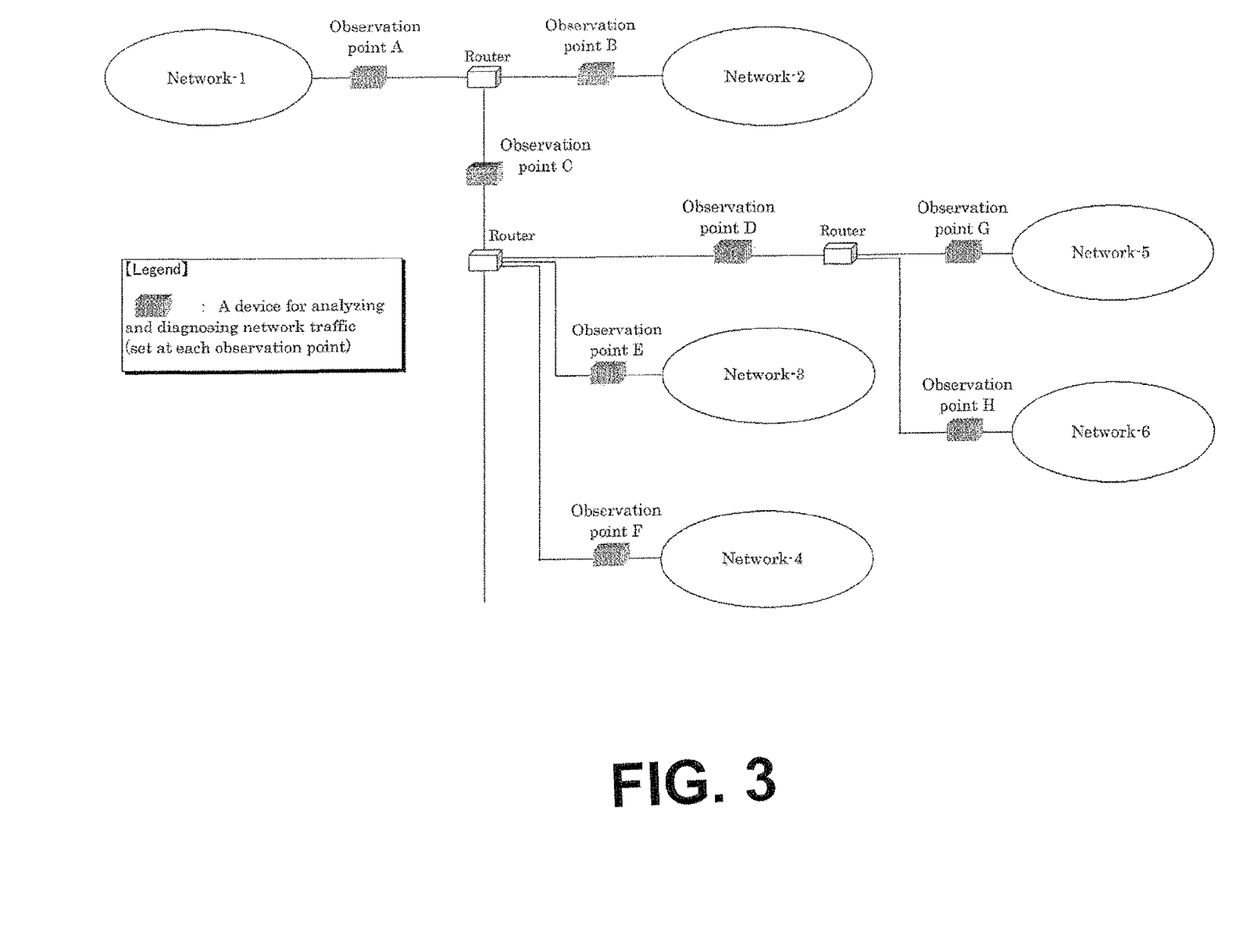
FIG. 3 is a schematic diagram illustrating the construction of a prototype of a system for traffic tracing using this invention.

In the following, we explain the system for traffic tracing, with reference to diagrams. FIG. 3 is a schematic diagram illustrating the construction of a prototype of a system for traffic tracing of this invention.

Shown in FIG. 3, a system for traffic tracing makes use of a device for analyzing and diagnosing network traffic, by setting the devices up at various places in the network. In the example of FIG. 3, the system will trace the source of illegal access by comparing the similarity of data detected in the systems at observation point A~H and detecting the directional characteristics of illegal access by comparing the similarity of data detected in the systems where illegal access has been detected.

To detect the directional characteristics, the devices must observe the same field with the same criteria for detection when they observe the number of distinct values of specific field in the header or payload of packets with respect to each packet type. When illegal access is detected, the devices at observation point A~H can detect the directional characteristics of illegal access by comparing the similarity of the numbers which have shown illegal values. For example, when illegal accesses are detected at observation point A and B, if the basis for determination in both cases is the Source address in the FTP application packets and, and the computed number is also similar, the fact that the illegal access has passed through the observation point A and B using FTP application can be inferred.

As mentioned above, the system can detect the directional characteristics of an illegal access and trace the source of the illegal access by setting devices for analyzing and diagnosing network traffic at various points in the network and comparing the data computed by each device.

INDUSTRIAL APPLICABILITY

In the past few years, the network environment has grown and an Internet-centered information network society has evolved. Network security is an essential service in such an environment. Many venders and software houses release a number of security tools and most companies and universities have used them. This invention provides the technique for detecting an illegal access, such as (D)DoS attacks, easily but with high accuracy and this technique is applicable to security tools. In this invention, the values of one or more pre-specified fields in the header and/or the payload of packets which is transmitted from external networks are observed, i.e., packets are observed by classifying the packets into some groups (e.g. application type). Therefore the system can detect small scale (D)DoS attacks where few addresses change and communication applications such as WINNY. use few addresses As a result, the probability of missing the illegal access has decreased and detection accuracy has improved.

When an illegal access is detected, since the type of application is specified, the system can deal with the problem more quickly than before. Moreover, communication failures such as link failures and out-of-service state caused by application error are easily detected. Therefore, when a trouble arises handling of the problem is quick.

A higher accuracy for detecting illegal access than earlier methods has been achieved by using a pre-specified ratio to judge the illegal access and using an arbitrary combination of two or more fields.

This invention allows weighing up the similarity of data and detecting the directional characteristics of the network traffic by setting up the devices for detecting and diagnosing network traffic in various places on the network. It can trace the source of illegal access.

What is claimed is:

1. A device for analyzing and diagnosing network traffic based on information in packets transmitted in a network, the device comprising:
    means for dividing the packets into k packet types based on protocol type and port number, where k is a natural number greater than zero;
    means for monitoring a number of first distinct values of one or more pre-specified fields in packet headers with respect to the k packet types, for all packets that have transited monitoring points in the network;
    means for monitoring a number of second distinct values of one or more pre-specified fields in payloads of the packets with respect to the k packet types, for all packets that have transited the monitoring points in the network; and
    diagnosis means for extracting one or more monitoring fields F1 from said one or more pre-specified fields in the packet headers and one or more monitoring fields F2 from said one or more pre-specified fields in the payloads of the packets, for establishing monitoring field FX that includes the monitored number of first distinct values of the monitoring fields F1 and the monitored number of second distinct values of the monitoring fields F2, and for judging that the network is abnormal when a ratio determined using the number of first and second distinct values in the monitoring field FX reaches a pre-specified threshold within a pre-specified fixed time interval.

2. The device according to claim 1, wherein the ratio is calculated based on at least one of the following conditions:
    (a) N(t) is the number of first and second distinct values in the monitoring field FX within the pre-specified fixed time interval from some time t, N(t1) is the number of first and second distinct values in the monitoring field FX within the pre-specified time fixed interval from some time t1, and if the ratio of N(t) to N(t1) is greater than, or equal to, some pre-specified ratio-threshold k1, that is, if $N(t)/N(t1) \geq k1$, it is judged that the network is abnormal;
    (b) P(t) is the number of packets in transmission within the fixed time interval from some time t, and if the ratio of N(t) to P(t) is greater than, or equal to, some pre-specified ratio-threshold k2, that is, if $N(t)/P(t) \geq k2$, it is judged that the network is abnormal;
    (c) P(t1) is the number of packets in transmission within the fixed time interval from time t1, and if the ratio $\{N(t)/P(t)\}/\{N(t1)/P(t1)\}$, is greater than, or equal to, some pre-specified ratio-threshold k3, that is, if $\{N(t)/P(t)\}/\{N(t1)/P(t1)\} \geq k3$, it is judged that the network is abnormal;
    (d) T(t) is the number of octets (or bits) in the packets in transmission within the fixed time interval from time t, and if the ratio of N(t) to T(t) is greater than, or equal to, some pre-specified ratio-threshold k4, that is, if $N(t)/T(t) \geq k4$, it is judged that the network is abnormal; and
    (e) if the ratios in (a)-(d) are lower than, or equal to, some pre-specified ratio-threshold k5, it is judged that the network is abnormal.

3. The device according to claim 2, wherein said diagnosis means is further for judging that a network attack is in progress when the TTL (Time To Live) value in the header field of one of the packets does not lie in a predetermined range.

4. The device according to claim 1, wherein said diagnosis means is further for judging that a network attack is in progress when the TTL (Time To Live) value in the header field of one of the packets does not lie in a predetermined range because the number of hops based on TTL value in the packet header is fixed.

5. The device according to claim 1 wherein said diagnosis means is further for judging that the network is abnormal when the number of first and second distinct values in the monitoring field FX reaches a pre-specified number-threshold within the pre-specified fixed time interval.

6. A system for analyzing and diagnosing network traffic based on information in packets in transmission in a network, wherein the system comprises the device of claim 1 on the route along which the packets pass in the network.

7. A traffic-tracing system, for tracing the source of illegal access in a network, wherein the system comprises the device of claim 1 arranged at various places in the network, and wherein the system is adapted to detect directional characteristics of an illegal access by comparing the similarity of data detected in the devices in which an illegal access has been detected.

8. A system for analyzing and diagnosing network traffic based on information in packets in transmission in a network, wherein the system comprises the device of claim 2 on the route along which the packets pass in the network.

9. A system for analyzing and diagnosing network traffic based on information in packets in transmission in a network, wherein the system comprises the device of claim 4 on the route along which the packets pass in the network.

10. A system for analyzing and diagnosing network traffic based on information in packets in transmission in a network, wherein the system comprises the device of claim 5 on the route along which the packets pass in the network.

11. A traffic-tracing system, for tracing the source of illegal access in a network, wherein the system comprises the device of claim 2 arranged at various places in the network, and wherein the system is adapted to detect directional characteristics of an illegal access by comparing the similarity of data detected in the devices in which an illegal access has been detected.

12. A traffic-tracing system, for tracing the source of illegal access in a network, wherein the system comprises the device of claim 4 arranged at various places in the network, and wherein the system is adapted to detect directional characteristics of an illegal access by comparing the similarity of data detected in the devices in which an illegal access has been detected.

13. A traffic-tracing system, for tracing the source of illegal access in a network, wherein the system comprises the device of claim 5 arranged at various places in the network, and wherein the system is adapted to detect directional characteristics of an illegal access by comparing the similarity of data detected in the devices in which an illegal access has been detected.

* * * * *

UNITED STATES PATENT AND TRADEMARK OFFICE
CERTIFICATE OF CORRECTION

PATENT NO.         : 8,689,326 B2                                              Page 1 of 1
APPLICATION NO.    : 12/161139
DATED              : April 1, 2014
INVENTOR(S)        : Glenn Mansfield Keeni It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1644 days.

Signed and Sealed this

Twenty-ninth Day of September, 2015

Michelle K. Lee
*Director of the United States Patent and Trademark Office*